Patented Sept. 12, 1922.

1,428,820

UNITED STATES PATENT OFFICE.

DAVID THOMSON, OF LONDON, ENGLAND.

PROCESS FOR THE EXTRACTION OF PROTEIDS AND LACTOSE FROM WHEY.

No Drawing.    Application filed December 12, 1921. Serial No. 521,875.

*To all whom it may concern:*

Be it known that I, DAVID THOMSON, a subject of the King of Great Britain and Ireland, and a resident of London, England, have invented a certain new and useful Process for the Extraction of Proteids and Lactose from Whey, of which the following is a specification.

My invention relates to the extraction of proteid substances from whey, that is to say, the fluid left after the separation of the curd from the milk in the process of making cheese, or the fluid obtained after the separation of casein by various commercial methods.

In carrying out my invention, I first estimate the degree of acidity of the whey (which has always an acid re-action). This estimation is advantageously performed by means of indicators or by electrical conductivity methods and is usually found to be about $P_H$ 4.5 in terms of hydrogen ion concentration.

The whey is now treated with an alkali, preferably $Na_2CO_3$ or NaOH so as to reduce its acidity by stages of about $P_H$ 0.5 at a time until it becomes neutral. It should be noted that the precise amount of alkali required for this purpose cannot be exactly predicted and depends upon the proteid content of the whey which is variable. At each successive stage of reduced acidity a precipitate of proteid matter settles out and must be removed in any suitable manner. It would appear that the precipitates obtained at different degrees of reduction of the acidity are not identical in composition because, if the acidity be largely and suddenly reduced, the total amount of precipitate obtained even after standing for some time is much less than the total obtained by the method above indicated; and I am led to believe that the precipitate formed at a given degree of reduction is partially re-dissolved on a further reduction. If the whey was originally acid to an extent $P_H$ 4.5 a precipitate will be produced when the acidity is reduced to $P_H$ 5.0; this having been removed and the solution further reduced to $P_H$ 5.5, a further precipitate is formed and after removal of this, still another when it is reduced to $P_H$ 6.0; $P_H$ 6.5 and finally when reduced to neutrality $P_H$ 7.0.

The protein remaining in solution when the whey has been reduced to neutrality is now precipitated by making the whey definitely alkaline to about $P_H$ 10.5 or more.

If desired the process may be reversed. According to this method, the whey is first brought to $P_H$ 10.5 or greater alkalinity, and after removal of the alkali-insoluble protein thus thrown down, the filtrate is treated with normal HCl by stages of $P_H$ 0.5 at a time until it reaches $P_H$ 4.5 acidity. The proteins precipitated at each stage are removed as before.

All the precipitates should be washed with alcohol before drying to remove traces of fat. This is accomplished, in the case of the acid precipitate, by mixing them with concentrated alcohol containing sufficient alkali to bring the mixture to neutrality. In the case of the alkaline precipitate alcohol containing the requisite amount of acid is used.

The several precipitates may be dried and mixed or dried and used separately.

Instead of reducing the $P_H$ by stages of .5 at a time, in some cases the whole of the protein can be taken out in three stages, e. g., $P_H$ 4.5 to $P_H$ 6.2 to $P_H$ 6.8 to $P_H$ 10.

The removal of the protein as above leaves the sugar of milk (lactose) in solution in such form and so free from protein that it may be easily recovered. To this end I evaporate the final solution after the removal of the protein, and preferably I evaporate it to about half its volume at a temperature of about 60 degrees C., and then heat it to 90 degrees C., after having rendered the reaction $P_H$ 4.5. This coagulates the remaining proteid which may be removed by means of a centrifugal machine. The remaining solution is then boiled down, and the lactose crystallizes out, when the syrupy fluid is allowed to cool.

I claim:—

1. A process of separating the protein and lactose substances from whey which consists in adding an alkali to the whey and removing the resultant precipitate, thereafter subjecting the whey to repetitions of the step of adding alkali and removing the resultant precipitate, next evaporating the final solution to about half its volume at a temperature of about 60 degrees C., again heating to about 90 degrees C. after rendering the reaction $P_H$ 4.5, removing the coagulated proteid, boiling down the remaining solution, and subsequently crystallizing out the lactose substantially as herein described.

2. A process of separating the protein substances from whey which consists in adding alkali until the whey is rendered definitely alkaline to about $P_H$ 10.5, removing the precipitated proteids, and subsequently evaporating the final solution.

3. A process of separating the protein substances from whey which consists in first adding alkali to the whey to the point of neutrality, thereby precipitating the proteids, removing the precipitates, then adding more alkali to bring the whey from neutrality to a stage of definite alkalinity thereby precipitating the remaining proteids, and subsequently evaporating the final solution.

4. A process of separating the protein substances from whey which consists in adding alkali to the whey and removing the resultant precipitate, thereafter subjecting the whey to repetitions of the step of adding alkali and removing the resulting precipitate until the point of neutrality is reached, then adding more alkali to render the whey definitely alkaline to about $P_H$ 10.5, evaporating the final solution and coagulating the remaining proteid, removing the latter, and crystallizing out the lactose substantially as herein described.

In testimony whereof I have affixed my signature hereto this 25th day of November, 1921.

DAVID THOMSON.